(12) United States Patent
Meek et al.

(10) Patent No.: US 7,444,313 B2
(45) Date of Patent: Oct. 28, 2008

(54) SYSTEMS AND METHODS FOR OPTIMIZING DECISION GRAPH COLLABORATIVE FILTERING

(75) Inventors: Christopher A. Meek, Kirkland, WA (US); David M. Chickering, Bellevue, WA (US); Christopher B. Weare, Bellevue, WA (US); Pradeep K. Gupta, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 336 days.

(21) Appl. No.: 10/654,131

(22) Filed: Sep. 3, 2003

(65) Prior Publication Data

US 2005/0049987 A1    Mar. 3, 2005

(51) Int. Cl.
*G06N 5/02* (2006.01)
*H04H 60/33* (2008.01)

(52) U.S. Cl. .......................................... 706/46; 725/13
(58) Field of Classification Search ................... 706/46; 725/13
See application file for complete search history.

(56) References Cited

U.S. PATENT DOCUMENTS

| 5,249,268 | A | * | 9/1993 | Doucet ........................ 709/230 |
| 5,704,017 | A | * | 12/1997 | Heckerman et al. ........... 706/12 |
| 5,724,567 | A | * | 3/1998 | Rose et al. ...................... 707/2 |
| 5,963,726 | A | * | 10/1999 | Rust et al. ..................... 703/13 |
| 6,154,736 | A | | 11/2000 | Chickering et al. |
| 6,216,134 | B1 | | 4/2001 | Heckerman et al. |
| 6,336,108 | B1 | | 1/2002 | Thiesson et al. |
| 6,345,265 | B1 | | 2/2002 | Thiesson et al. |
| 6,408,290 | B1 | | 6/2002 | Thiesson et al. |
| 6,496,816 | B1 | | 12/2002 | Thiesson et al. |
| 6,519,599 | B1 | | 2/2003 | Chickering et al. |

OTHER PUBLICATIONS

Bianca Zadrozny et al., Obtaining calibrated probability estimates from decision trees and naive Bayesian classifiers, 2001, Department of Computer Science and Engineering, University of California, San Diego, La Jolla, California 92093-0114.*
Michael Miller, Special Edition Using the Internet and Web, 2001, Que.*

* cited by examiner

*Primary Examiner*—Joseph P. Hirl
*Assistant Examiner*—Nathan H Brown, Jr.
(74) *Attorney, Agent, or Firm*—Amin, Turocy & Calvin, LLP (57) ABSTRACT

The present invention provides collaborative filtering systems and methods employing default scores of decision graphs/trees to quickly create a top-n prediction list that can efficiently determine a user's interest in items. In one instance of the present invention, the list is refined by utilizing a variable maximum score algorithm and/or an invalidation list algorithm to insert items that score above an inclusion threshold set by a last item in the top-n prediction list. In another instance of the present invention, an invalidation list for a decision graph and/or decision tree is utilized to create a top-n prediction list. An algorithm employing default scores is then utilized to refine the top-n prediction list to insert items with default scores above an inclusion threshold set by a last item in the top-n prediction list.

24 Claims, 9 Drawing Sheets

FIG. 9

SYSTEMS AND METHODS FOR OPTIMIZING DECISION GRAPH COLLABORATIVE FILTERING

REFERENCE TO RELATED APPLICATION

This application is related to U.S. patent application Ser. No. 09/681,742, which was filed by David Maxwell Chickering, et al. on May 30, 2001, entitled A SYSTEM AND PROCESS FOR AUTOMATICALLY PROVIDING FAST RECOMMENDATIONS USING LOCAL PROBABILITY DISTRIBUTIONS and is herein incorporated by reference (hereinafter known as "Chickering, et al.").

TECHNICAL FIELD

The present invention relates generally to data analysis, and more particularly to systems and methods for optimizing decision graph collaborative filtering.

BACKGROUND OF THE INVENTION

The use of data analysis tools has increased dramatically as society becomes dependent on digital information storage. In e-commerce and other Internet and non-Internet applications, databases are generated and maintained that have astronomically large amounts of information. Such information is typically analyzed, or "mined," to learn additional information regarding customers, users, products, etc. This information allows businesses and other users to better implement their products and/or ideas.

Electronic commerce is a staple for most conceivable types of businesses. People have come to expect that their favorite stores not only have brick and mortar business locations, but that they can also be accessed "online," typically via the Internet's World Wide Web. The Web allows customers to view graphical representations of a business' store and products. Ease of use from the home and convenient purchasing methods, typically lead to increased sales. Buyers enjoy the freedom of being able to comparison shop without spending time and money to drive from store to store.

Online commerce continues to be improved to bring a more enjoyable buying experience to online buyers. Often, websites require a "log in" and/or utilize a "cookie" to track which buyer is looking at their website. With this information, a business can track purchase parameters such as type, size, quantity, and purchasing frequency. This is valuable information because it allows a company to forecast future sales and to determine what goods are of the most interest to online buyers. Sometimes, however, people tend to exhibit distinct individualism in their tastes, whether for purchases or other activities. For example, a company who sells paper online might assume that their buyers are utilizing it for craft projects. Since the company also sells crayons, they may include an advertisement for crayons next to their paper advertisement on their website. In actuality, however, some customers may be purchasing the paper for business office use, and the crayon advertisement may even turn some customers away due to the fact that the company seems to not understand their individual needs correctly. Had the company, instead, offered staples and/or paper clips along with the paper at the appropriate customer, they might have seen increased sales for all of their products as those buyers might perceive their store as a "one-stop shop" for all of their business office supply needs.

Prior to the advent of online selling, a salesperson would typically approach a customer and ask them a series of questions to better understand their likes and dislikes along with their prior purchasing habits. Through this interaction, the salesperson is able to determine suggestions for products this particular customer might like. This same type of "associative selling" is also just as important to online merchants. However, there is no salesperson to "size up" a customer online and determine their needs and wants. Instead, programs are utilized to determine suggestions for online buyers when they visit a business' website. For example, consider an online buyer who previously bought a dog bowl and a dog bone. Probabilities can be determined that show that it is likely that this person owns a dog. The person might, therefore, be interested in dog related items such as dog collars, leashes, and brushes. Since these items are brought to the attention of the buyer, if it matches their needs, they are more likely to purchase those items than, for instance, an advertisement for catnip or a bird feeder.

Although associative type selling is extremely advantageous, it is also generally very difficult to actually determine associations for distinct individuals. This is generally due to complex computing requirements, difficulty in accessing and retrieving the necessary information, and/or long computational calculation times. If a method is inaccurate, it can possibly drive customers away, causing losses in sales. Just like with a good salesperson, correctly associated products can lead to increased sales, while, like a bad salesperson, incorrectly associated products may cause a decrease in sales. Therefore, it is important to have an accurate means to associate various products/items for diverse individuals. This includes those with esoteric tastes who visit a website only once in a great while, along with those who have more traditional tastes and buy frequently from the same website.

Techniques that facilitate in determining preferences of a user are also known as "collaborative filtering." A collaborative filtering system can produce recommendations by determining similarities between a user's preferences. The value of this type of information increases daily as society moves towards an electronic oriented environment. Preferences can be utilized in any number of ways such as by computers, televisions, satellite radios, and other devices that lend themselves to the potential of having interactivity with a user.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to data analysis, and more particularly to systems and methods for optimizing collaborative filtering (CF) for decision graphs and/or decision trees. In one instance of the present invention, default scores of a decision graph/tree are leveraged to quickly create a top-n prediction list that can efficiently determine a user's interest in items. The list is then refined by utilizing a variable maximum score algorithm and/or an invalidation list algorithm to insert items that score above an inclusion threshold set by a last item in the top-n prediction list. In another instance of the present invention, an invalidation list for a decision graph and/or decision tree is utilized to create a top-n prediction list. An algorithm employing default scores is then utilized to refine the top-n prediction list to insert items with default scores above an inclusion threshold set by a last item in the top-n prediction list. By improving collaborative filtering, dramatic increases in performance are obtained in recommending items to users, allowing recommendations to be accomplished in real-time for high traffic loads. This facilitates in simplifying user interfaces and increasing user satisfaction with items/systems that employ the present invention.

The present invention also facilitates data analysis by providing a means to create a collaborative filtering/recommendation system that is computationally efficient and able to utilize sparse data quickly. This allows a CF/recommendation system to seed a top-n preference list that is reasonably accurate before evidence data (e.g., a user's preferences) is known. Servers will benefit from being able to readily provide recommendations quickly and accurately. This flexibility drastically increases the usefulness of collaborative filtering and allows users with stringent timing requirements to integrate CF into their businesses and products where timing constraints previously prohibited its utilization.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The present invention is an approach to speed up a prediction process when utilizing decision graphs and/or decision trees. One aspect of the present invention incorporates an observation that if most variables have their default values then many scores for the variables will be default values. This allows the present invention to provide a significant speedup for the prediction problem. By pre-computing the default values, a fast algorithm is obtained for a prediction problem. For example, consider one instance of the present invention that provides a collaborative-filtering/recommendation system that recommends news stories to users, based on other news stories that they've read. For each story in a domain, there is a decision-tree model that returns a probability that a user will be interested in that story, given all of the other stories that the user has read. An application of the present invention takes as input a set of stories that a user has read, and returns a list of some constant size n (e.g., n=10) containing n stories in which the user is most likely interested.

In related application Chickering, et al., herein incorporated by reference, the problem of constructing a top-n list is optimized as follows: for each decision tree, a maximum probability (or more generally, a maximum score) is found that can be returned by that tree. Decision trees are then sorted by this maximum score. To construct a top-n list of stories, a sorted list of trees is traversed in descending order: if the list does not yet contain n elements, a story corresponding to a current decision tree is simply added to the top-n list, and an associated probability (or score) of that story is recorded for a user; if n elements already exist in the list, a check is performed to see if the current decision tree returns a probability that is greater than a lowest-probability story in the top-n list, and if it does, the lowest-probability story in the list is replaced by this new story. By pre-sorting the decision trees, a search can terminate early and return the current list whenever a maximum probability of a current decision tree is smaller than a smallest probability in the top-n list: it is guaranteed that no later tree in the list can produce a recommendation that is better than the worst one in the list.

Although the previous invention yields enormous speedups over traversing all (unsorted) trees to construct a top-n list, there are many domains in which this process can be made even faster. One aspect of the present invention is to exploit the fact that data is often very sparse: although there are thousands of news stories, any particular user is likely to have read only a small handful of them. Suppose that instead of sorting decision graphs/trees by maximum score, they are sorted by a score that results if a user never read any of the stories. Each decision graph/tree typically splits on only a small fraction of a number of stories in a domain, and thus a sorted-by-default list is likely to be reasonably close to the list if sorted by a "real" score corresponding to a typical user. Thus, one instance of the present invention describes systems and methods utilizing a set of decision graphs/trees "sorted by default" to construct a top-n list very quickly. Another aspect of the present invention, for example, is that given a set of stories read by a user, there will usually be only a small number of decision graphs/trees for which a default sort value is no longer the correct value, and the default sort for a user can be "corrected" very quickly.

Figure 1:
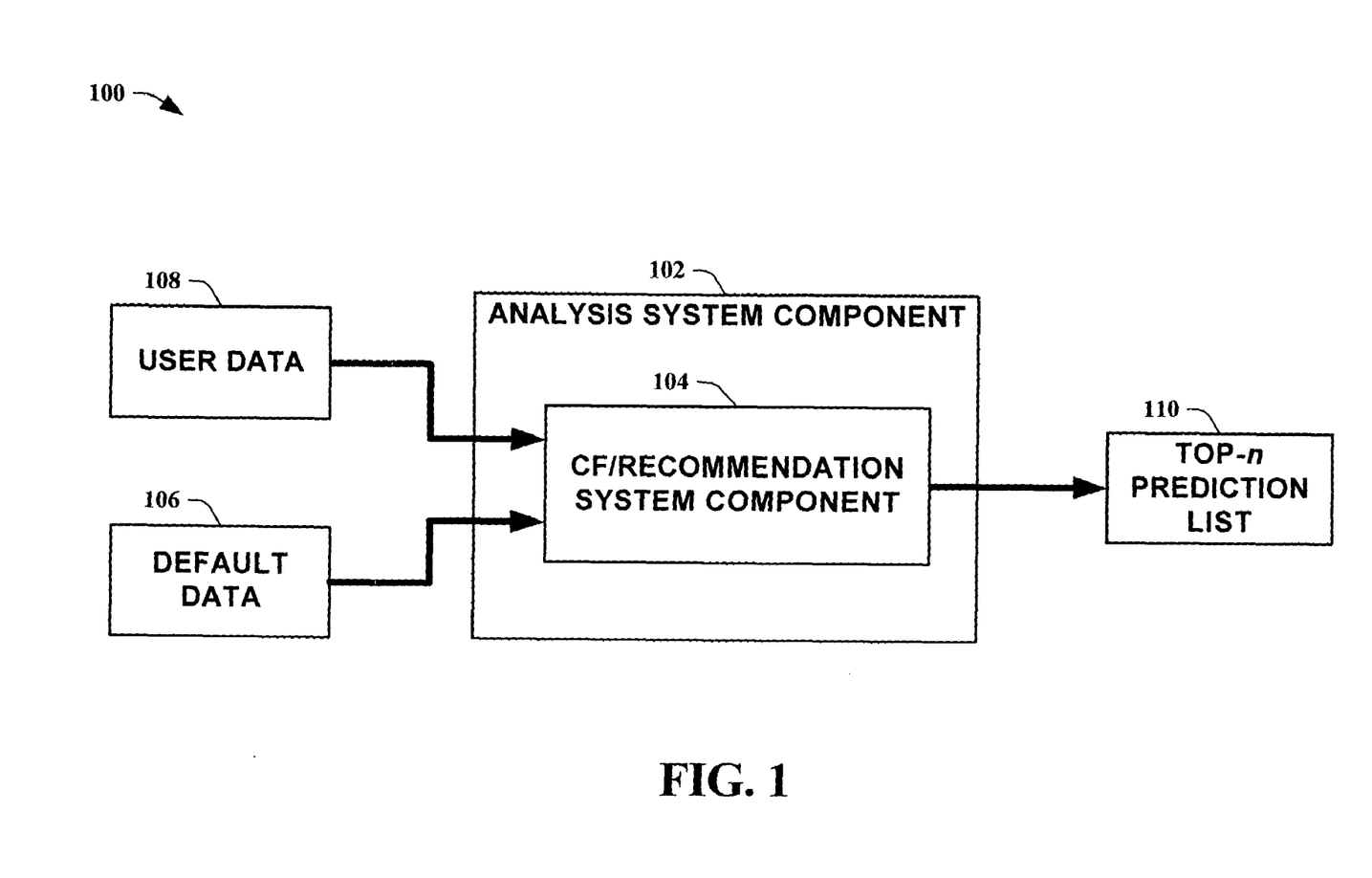
FIG. 1 is a block diagram of an analysis system in accordance with an aspect of the present invention.

In FIG. 1, a block diagram of an analysis system 100 in accordance with an aspect of the present invention is shown. The analysis system 100 is comprised of an analysis system component 102. In this instance of the present invention, the analysis system component 102 is comprised of a collaborative filtering (CF)/recommendation system component 104. Default data 106 and user data (i.e., evidence) 108 are input into the system 100 and processed by the collaborative filtering/recommendation system component 104 to produce a "top-n prediction list" 110 for a user. The default data 106 is utilized to create a "default top-n prediction list" to speedup the process of obtaining a prediction list. This list is then refined by user or "evidence" data. The top-n prediction list 110 represents a list of items that might be of interest to the user. In this manner, quick predictions can be obtained for items even with sparse user input data. A higher value can indicate a more preferential association than a lower score value. Subsequent associations can also be derived from the list 110 based upon the computed scores. As an example, several television show preferences can be input as data. A resulting top-n prediction list might show a top 10 list of shows that a particular user might be interested in.

Figure 2:
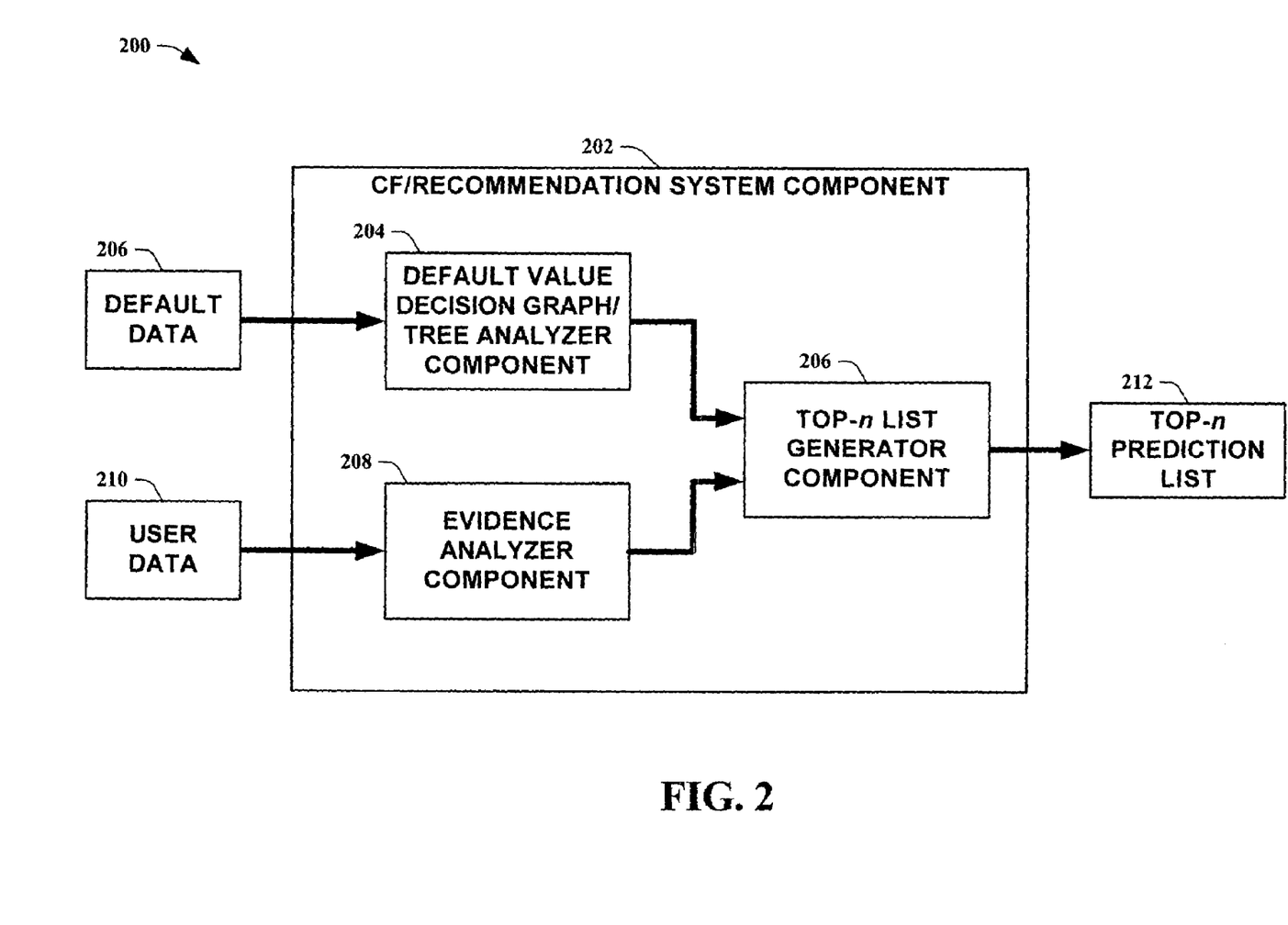
FIG. 2 is a block diagram of a collaborative filtering/recommendation system in accordance with an aspect of the present invention.

Turning to FIG. 2, a block diagram of a collaborative filtering/recommendation system 200 in accordance with an aspect of the present invention is illustrated. The collaborative filtering/recommendation system 200 is comprised of a collaborative filtering/recommendation system component 202 with input default data 206, input user data 210 and a resulting top-n prediction list 212. The collaborative filtering/recommendation system component 202 is comprised of a default value decision graph/tree analyzer component 204, an evidence analyzer component 208, and a top-n list generator component 206. In one instance of the present invention, the default value decision graph/tree analyzer component 204 facilitates prediction by defining a default configuration, generating default scores for each attribute, generating a default score list, and constructing a variable-invalidation list. These aspects are described in detail infra. The default score list and variable-invalidation list are passed to the top-n list generator component 206. If no user or evidence data is input, the top-n list generator component 206 outputs a top-n prediction list 212 based on the default score list. The evidence analyzer component 208 receives user or evidence data 210 and facilitates prediction by constructing a corresponding set of evidence if the user data 210 only consists of configuration data. The set of evidence is then passed onto the top-n list generator component 206 for utilization in determining the top-n prediction list 212. Further details of the generation of the top-n prediction list 212 are found infra.

It is helpful to understand the terminology utilized to describe the present invention. A set of variables and a collection of decision graphs/trees are provided, one for each variable. A default value for each variable is also given. A configuration is a list of values for each variable. A set of evidence (or evidence) is a set of variable/value pairs in which no variable occurs in its default value. A configuration corresponding to evidence is a configuration in which all variables not specified in the evidence are assigned a default value. For example, suppose binary variables X, Y, and Z are provided and that state zero is a default value for each variable. Then {X=1,Y=1} is a set of evidence for the variables, and {X=1, Y=1,Z=0} is a corresponding configuration.

Given a set of evidence or a configuration, a decision graph/tree is utilized to compute a score for each variable. Examples of scores are a conditional probability of a particular value of the variable and/or a "lift" (a conditional probability divided by a marginal probability). The prediction problem is to take the evidence and produce a ranked top-n list of variables that have the highest score according to a collection of decision graphs/trees. One aspect of the present invention incorporates an observation that if most of the variables have their default values then many of the scores for the variables will be the default value. This allows the present invention to provide a significant speedup for the prediction problem. Thus, by pre-computing default values, a fast algorithm for the prediction problem is obtained by one instance of the present invention.

Figure 3:
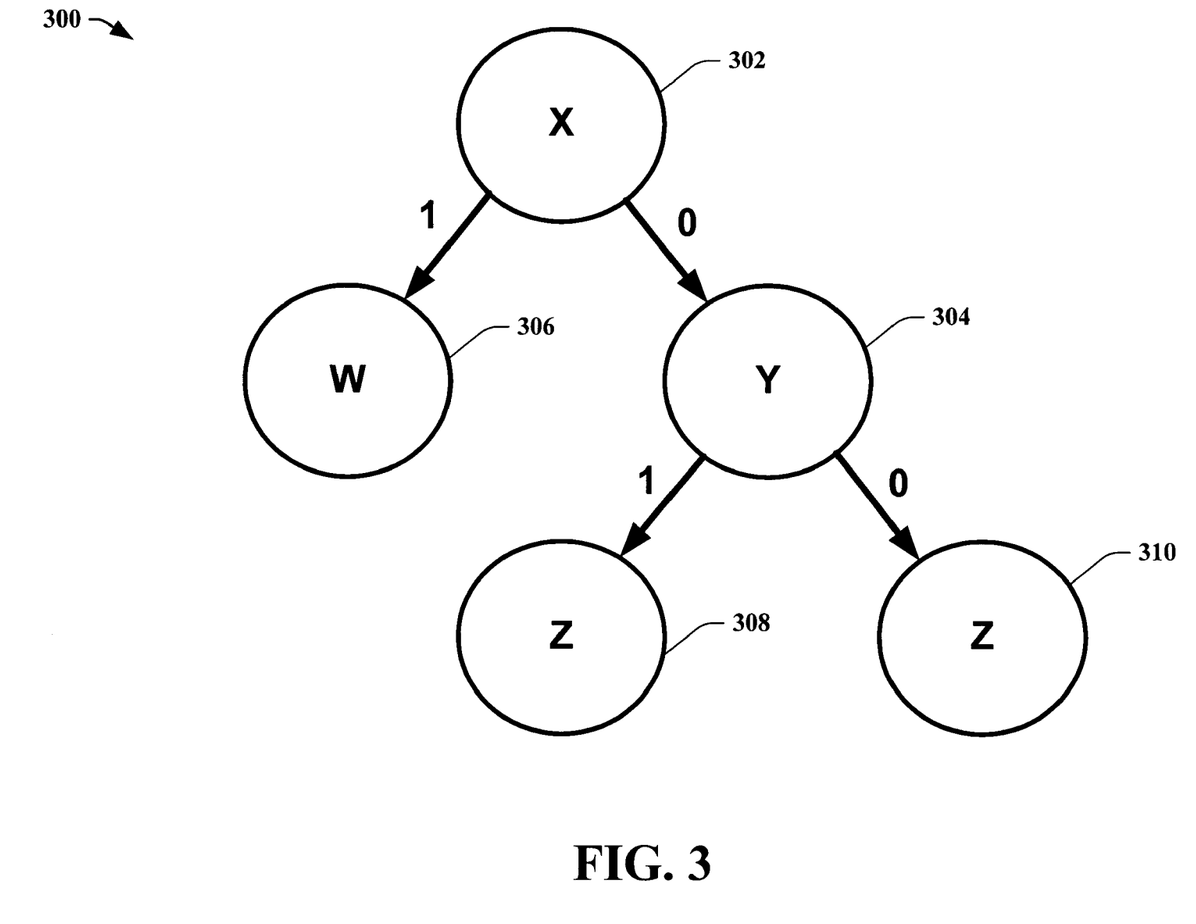
FIG. 3 is an example of decision trees in accordance with an aspect of the present invention.

A default configuration is defined in which each variable is assigned to have that variables default value (typically the most likely value of an attribute). Utilizing the default configuration, a default score for each of the attributes is computed. Associated with each decision graph is a default path that leads to a single leaf when using the default configuration. The attributes on the default path are called default splits for a variable. Referring to FIG. 3, an example of decision trees 300 in accordance with an aspect of the present invention is depicted. Consider the following illustration of these definitions. A set of variables for this example prediction problem are W, X, Y, and Z. The decision trees 300 shown in FIG. 3 are used to compute a score for a target variable Z. Decision trees for other variables are not shown. If given configuration {X=0, Y=1}, an appropriate value at leaf 308 can be looked up; starting at a root node 302 which is labeled with variable X. Because the configuration has X=0, an arc labeled with 0 is followed to reach node 304 (an arc 1 reaching node 306 is not utilized in this example). Similarly, because Y=1, leaf 308 is reached where a value for a score of Z can be looked up. For this example, assume a default for all variables is zero. A default score for variable Z is obtained from leaf 310, a default path is a sequence of nodes (302, 304, 310), and default splits for variable Z are X and Y.

A list of variable default-value pairs is constructed and the list is sorted by score in descending order. This list is called a default score list. Note that by using this list, a prediction problem is solved when a default configuration or an empty set of evidence is given. A variable invalidates a second variable if the variable is a default split for the decision tree for a second variable Z. In this example, X invalidates Z. This terminology is utilized because if X is not in a default state then variable Z may not receive its default score. Next, a variable-invalidation list is constructed in which each variable is associated with variables that it invalidates. For the example, assume a variable-invalidation list is ({X,{Z,Y}}, {Y,{Z}},{Z,{W,Y}}). The entry for X and Y both contain variable Z because X and Y are default splits in the decision tree in FIG. 3.

Either a set of evidence or a configuration is typically given. If a configuration is given, the corresponding set of evidence is constructed in which all variables are removed that have been assigned their default value. An invalidation list is constructed from the variable-invalidation list and the evidence by taking the union of the sets of variables invalidated by variables in evidence. If the evidence is {X=1,Y=1} then a invalidation list is a union of {Z,Y} and {Z} which is equal to {Z,Y}. This is a set of decision trees that might not have a default value.

In the following systems, one instance of the present invention starts with a list of n items, and then repeatedly inserts new items into this list; by "insert", it is meant to replace a lowest-scoring item with a new item. Thus, the list could be implemented as a priority queue. A first instance of the present invention is described as follows and illustrated in Table 1. First, identify top n items from a default-score list that are not in an invalidation list. Store this in a list called a top-n list. This list is kept in sorted order in descending order by (default) score. A score of a last item in the top-n list is called an inclusion threshold. A maximum score (max-score) for a variable is a maximum possible score for that variable (i.e., the highest score of any of the leaves of the decision graph/tree). Next, construct a variable max-score list of variable max-scores pairs sorted in descending order by score. Finally, utilize an algorithm, such as illustrated in Table 1, to create a top-n prediction list. This algorithm utilizes a top-n list, evidence, an invalidation list and a variable max-score list that is called "VMSL." A "VMSL[i].maxscore" is utilized to denote a maximum possible score for an i'th item in a list VMSL and "VMSL[i].variable" to denote a name of an i'th variable. "Currscore" is utilized to indicate a current score of a variable.

TABLE 1

VMSL

For i = 1 to sizeof(VMSL);
  If VMSL[i].maxscore < inclusion threshold then break;
  If VMSL[i].variable is not in the invalidation list then continue;
  Currscore = Get_score(VMSL[i].variable, evidence);
  If currscore > inclusion-threshold;
    Insert (VMSL[i].variable, currscore) into the top-n list;
Return top-n list.

A second instance of the present invention is described as follows and in Table 2. First, identify top n items from a default-score list that are not in an invalidation list. Store this in a list called a top-n list. A score of a last item in the top-n list is called an inclusion threshold. An algorithm, such as illustrated in Table 2, is then utilized to create a top-n prediction list. "InvList" is utilized to denote an invalidation list and "InvList[i]" to denote an i'th variable in the list. "Currscore" is utilized to indicate a current score of a variable.

TABLE 2

InvList

For i = 1 to sizeof(InvList);
    Currscore = Get_score(InvList[i]; evidence);
    If currscore > inclusion-threshold;
      Insert (InvList[i], currscore) into the top-n list;
    Return top-n list.

A third instance of the present invention is described as follows and illustrated in Table 3. First, identify top n items from an invalidation list that are not in a default-score list. This is typically generated, in one instance of the present invention, by constructing an initial list from a variable max-score list (VMSL) and excepting any tree for which a variable is in a default state. Store this in a list called a top-n list. A score of a last item in the top-n list is called an inclusion threshold. An algorithm, such as illustrated in Table 3, is utilized to create a top-n prediction list. "DefList" is utilized to denote a default-score list and "DefList[i]" to denote an i'th variable in the list and "DefList[i].default-score" to denote the i'th variable's default score. "Currscore" is utilized to indicate a current score of a variable. In one instance of the present invention, the DefList contains all variables, including ones that are not in a default state. Thus, after observing evidence, those variables that are not in a default state are marked so that they can be skipped during processing (such as indicated in Table 3).

TABLE 3

DefList

For i = 1 to sizeof(DefList);
  Currscore = DefList[i].default-score;
  If (DefList[i] in invalidation list) then continue;
  If(currscore > inclusion-threshold)
    Then Insert (DefList[i], currscore) into the top-n list;
    Else Break;
Return top-n list.

In view of the exemplary systems shown and described above, methodologies that may be implemented in accordance with the present invention will be better appreciated with reference to the flow charts of FIGS. 4-7. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 4:
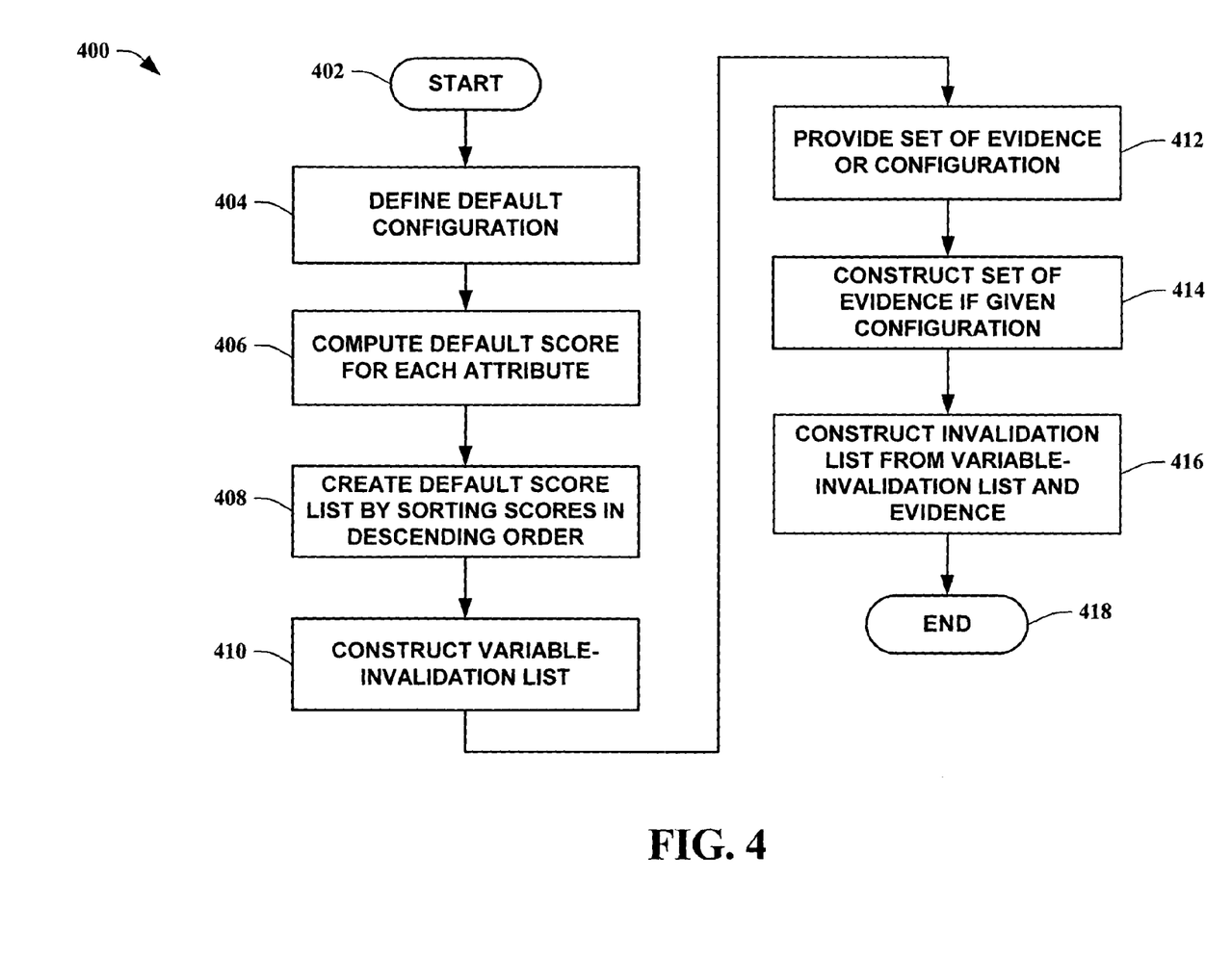
FIG. 4 is a flow diagram of a method of optimizing decision graph collaborative filtering in accordance with an aspect of the present invention.

In FIG. 4, a flow diagram of a method 400 of optimizing decision graph/tree collaborative filtering in accordance with an aspect of the present invention is illustrated. The method 400 starts 402 by defining a default configuration for a decision graph/tree 404. In this process, variables are assigned to have their default value which is the most likely value of an attribute. Utilizing the default configuration, a default score is then computed for each attribute 406. Examples of means to compute a default score include, but are not limited to, conditional probability and lift and the like. A list of variable default-value pairs is constructed and the list is sorted by score in descending order to create a default score list 408. If an empty set of evidence and/or a default configuration is given, the default score list becomes a top-n list. A variable-invalidation list is then constructed that associates a variable with variables that it invalidates 410. A set of evidence and/or a configuration is provided for an entity such as a user that indicates choices and/or preferences 412. If a configuration is given, a corresponding set of evidence is constructed in which variables are removed that have been assigned their default value 414. An invalidation list is then constructed from the variable-invalidation list and the evidence by taking a union of a set of variables invalidated by variables in the evidence 416, ending the flow 418.

Figure 5:
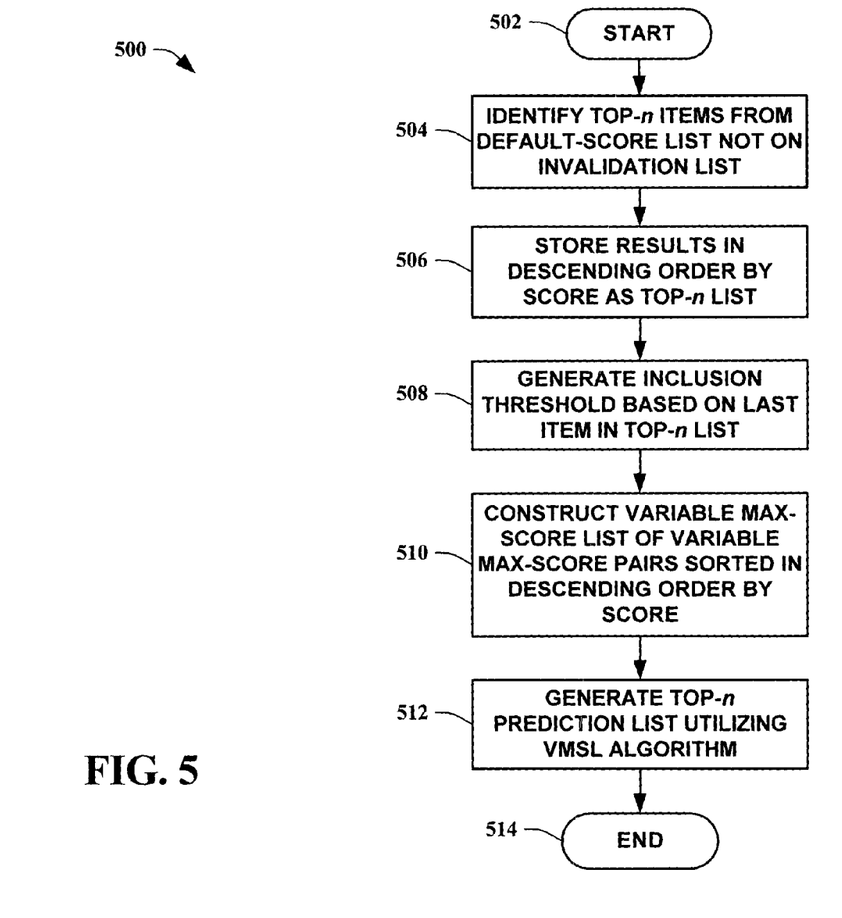
FIG. 5 is another flow diagram of a method of optimizing decision graph/tree collaborative filtering in accordance with an aspect of the present invention.

Referring to FIG. 5, another flow diagram of a method 500 of optimizing decision graph/tree collaborative filtering in accordance with an aspect of the present invention is shown. The method 500 starts 502 by identifying top-n items from a default-score list that are not on an invalidation list 504. An invalidation list is created from a variable-invalidation list and evidence by utilizing a union of sets of variables invalidated by variables in the evidence. Resulting items are stored in descending order by score and create a top-n list 506. Thus, a means is obtained to create a quick and efficient seed list for items of interest. This list can be computed before any evidence data is obtained. An inclusion threshold is then generated based on a last item in the top-n list 508. The inclusion threshold provides a minimum level that must be exceeded before a new item is inserted in the top-n list. A variable maximum score list is created for variable maximum score pairs that are sorted in descending order by score 510. A maximum score for a variable is a maximum possible score for that variable such as a highest score of any leaves of a decision graph/tree. A variable maximum score list algorithm is then employed to generate a top-n prediction list 512, ending the flow 514. The top-n prediction list can represent any number of items that are of interest to an entity such as a user and the like. Thus, the list can be utilized to predict a user's possible interests in items such as products, services, and information and the like.

Figure 6:
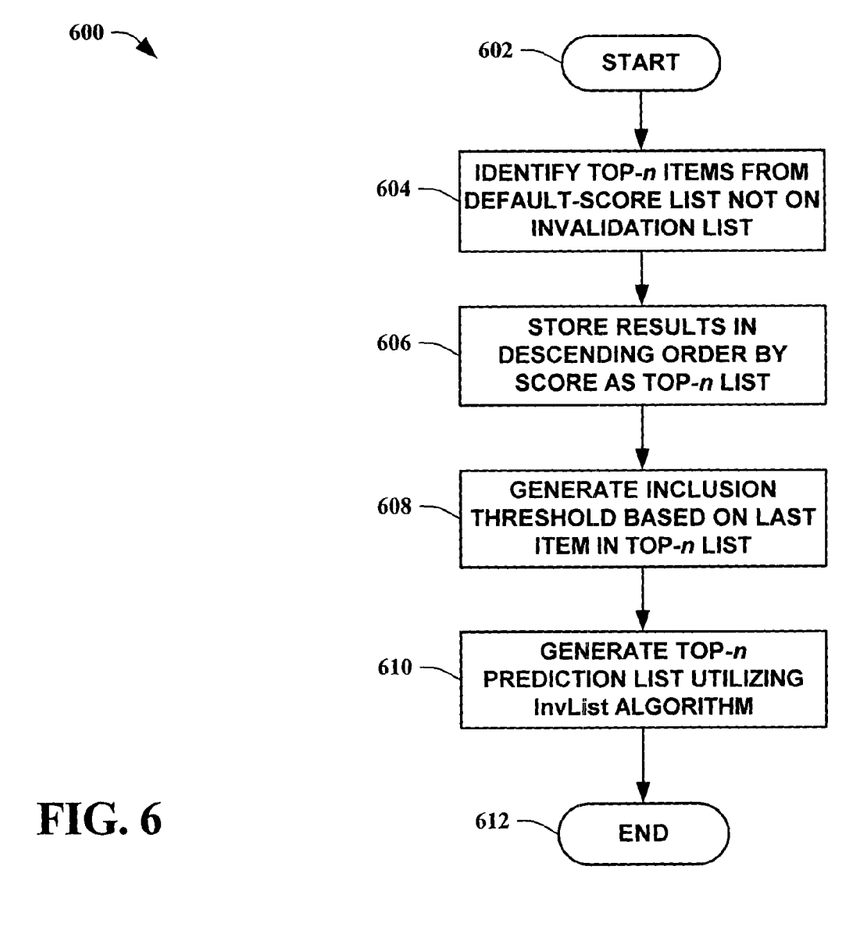
FIG. 6 is yet another flow diagram of a method of optimizing decision graph/tree collaborative filtering in accordance with an aspect of the present invention.

Turning to FIG. 6, yet another flow diagram of a method 600 of optimizing decision graph/tree collaborative filtering in accordance with an aspect of the present invention is illustrated. The method 600 starts 602 by identifying top-n items from a default-score list that are not on an invalidation list 604. An invalidation list is created from a variable-invalidation list and evidence by utilizing a union of sets of variables invalidated by variables in the evidence. Resulting items are stored in descending order by score and create a top-n list 606. Thus, a means is obtained to create a quick and efficient seed list for items of interest. This list can be computed before any evidence data is obtained. An inclusion threshold is then generated based on a last item in the top-n list 608. The inclusion threshold provides a minimum level that must be exceeded before a new item is inserted in the top-n list. An invalidation list algorithm is then employed to generate a top-n prediction list 610, ending the flow 612. The top-n prediction list can represent any number of items that are of interest to an entity such as a user and the like. Thus, the list can be utilized to predict a user's possible interests in items such as products, services, and information and the like.

Figure 7:
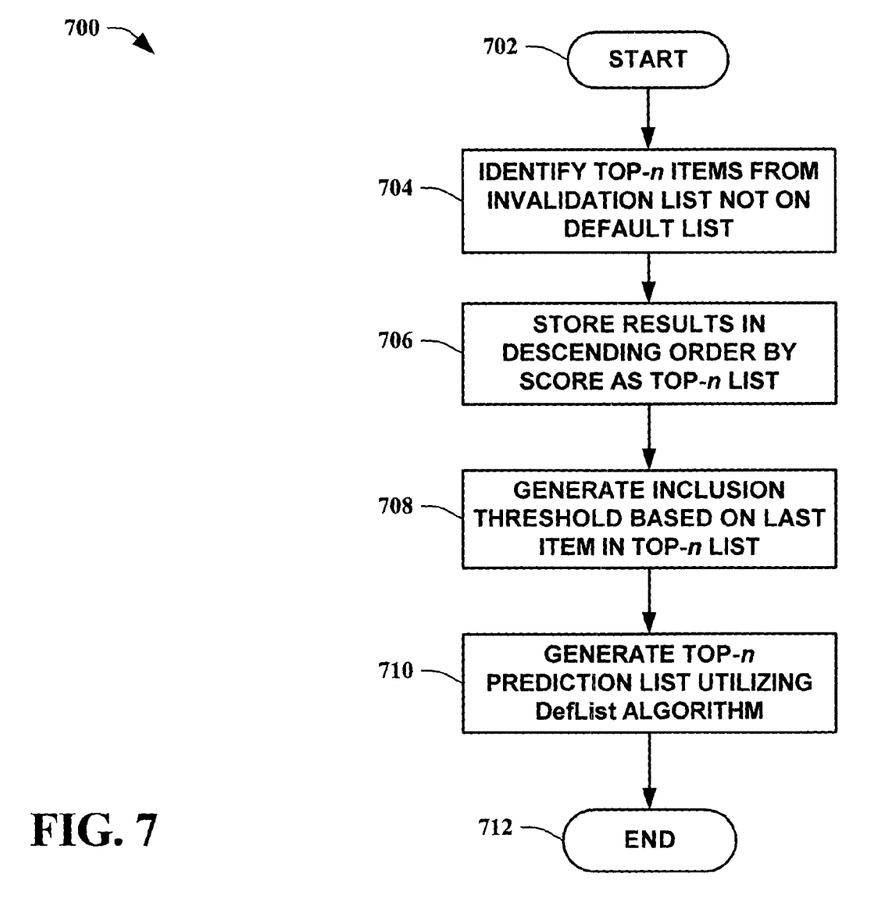
FIG. 7 is still yet another flow diagram of a method of optimizing decision graph/tree collaborative filtering in accordance with an aspect of the present invention.

Referring to FIG. 7, still yet another flow diagram of a method 700 of optimizing decision graph/tree collaborative filtering in accordance with an aspect of the present invention is depicted. The method 700 starts 702 by identifying top-n items from an invalidation list that are not on a default-score list 704. An invalidation list is created by from a variable-invalidation list and evidence by utilizing a union of sets of variables invalidated by variables in the evidence. Resulting items are stored in descending order by score and create a top-n list 706. An inclusion threshold is then generated based on a last item in the top-n list 708. The inclusion threshold provides a minimum level that must be exceeded before a new item is inserted in the top-n list. A default score list algorithm is then employed to generate a top-n prediction list 710, ending the flow 712. The top-n prediction list can represent any number of items that are of interest to an entity such as a user and the like. Thus, the list can be utilized to predict a user's possible interests in items such as products, services, and information and the like.

Figure 8:
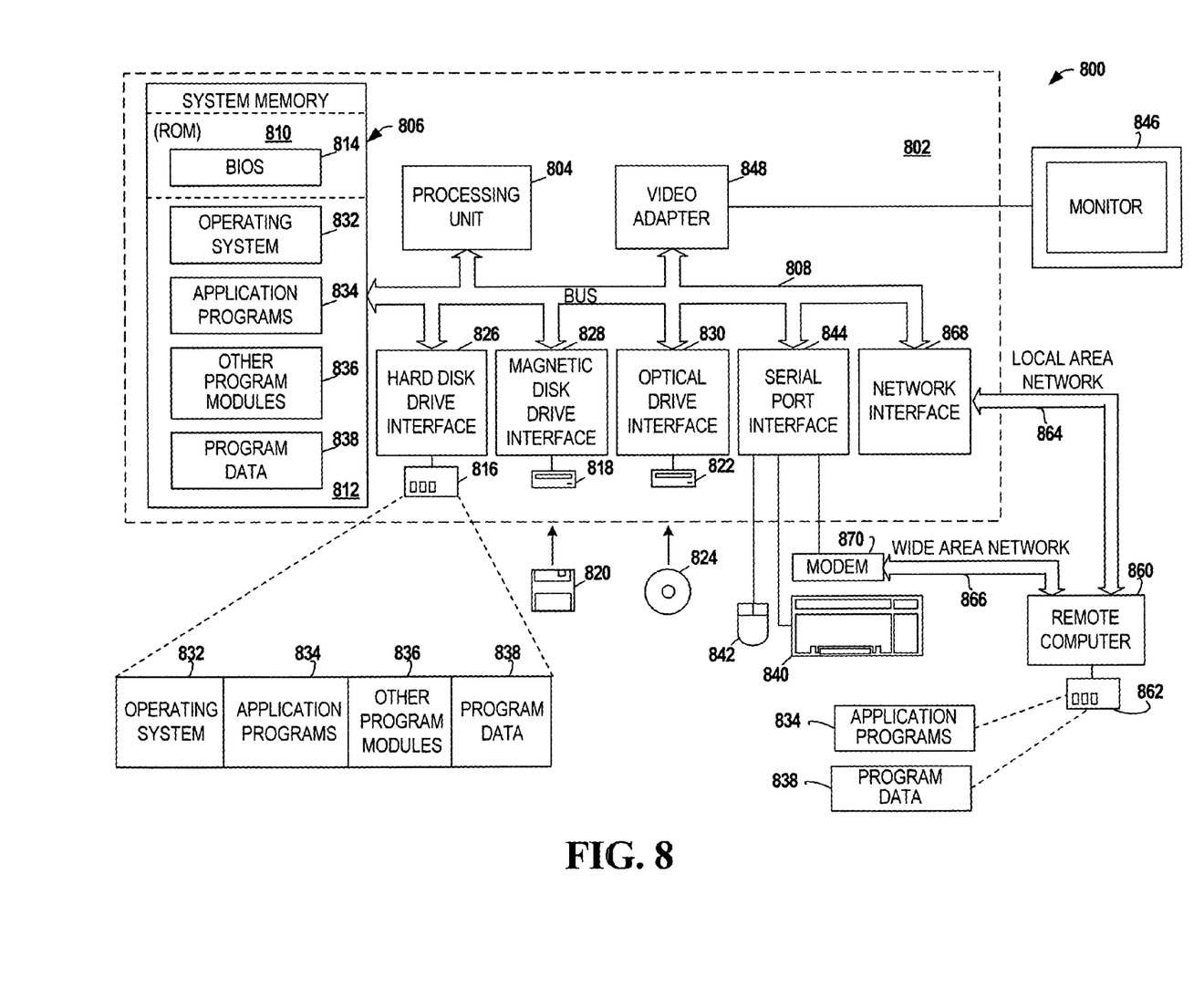
FIG. 8 illustrates an example operating environment in which the present invention can function.

In order to provide additional context for implementing various aspects of the present invention, FIG. 8 and the following discussion is intended to provide a brief, general description of a suitable computing environment 800 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 8, an exemplary system environment 800 for implementing the various aspects of the invention includes a conventional computer 802, including a processing unit 804, a system memory 806, and a system bus 808 that couples various system components, including the system memory, to the processing unit 804. The processing unit 804 may be any commercially available or proprietary processor. In addition, the processing unit may be implemented as multi-processor formed of more than one processor, such as may be connected in parallel.

The system bus 808 may be any of several types of bus structure including a memory bus or memory controller, a peripheral bus, and a local bus using any of a variety of conventional bus architectures such as PCI, VESA, Microchannel, ISA, and EISA, to name a few. The system memory 806 includes read only memory (ROM) 810 and random access memory (RAM) 812. A basic input/output system (BIOS) 814, containing the basic routines that help to transfer information between elements within the computer 802, such as during start-up, is stored in ROM 810.

The computer 802 also may include, for example, a hard disk drive 816, a magnetic disk drive 818, e.g., to read from or write to a removable disk 820, and an optical disk drive 822, e.g., for reading from or writing to a CD-ROM disk 824 or other optical media. The hard disk drive 816, magnetic disk drive 818, and optical disk drive 822 are connected to the system bus 808 by a hard disk drive interface 826, a magnetic disk drive interface 828, and an optical drive interface 830, respectively. The drives 816-822 and their associated computer-readable media provide nonvolatile storage of data, data structures, computer-executable instructions, etc. for the computer 802. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 800, and further that any such media may contain computer-executable instructions for performing the methods of the present invention.

A number of program modules may be stored in the drives 816-822 and RAM 812, including an operating system 832, one or more application programs 834, other program modules 836, and program data 838. The operating system 832 may be any suitable operating system or combination of operating systems. By way of example, the application programs 834 and program modules 836 can include optimizing decision graph/tree collaborative filtering in accordance with an aspect of the present invention.

A user can enter commands and information into the computer 802 through one or more user input devices, such as a keyboard 840 and a pointing device (e.g., a mouse 842). Other input devices (not shown) may include a microphone, a joystick, a game pad, a satellite dish, wireless remote, a scanner, or the like. These and other input devices are often connected to the processing unit 804 through a serial port interface 844 that is coupled to the system bus 808, but may be connected by other interfaces, such as a parallel port, a game port or a universal serial bus (USB). A monitor 846 or other type of display device is also connected to the system bus 808 via an interface, such as a video adapter 848. In addition to the monitor 846, the computer 802 may include other peripheral output devices (not shown), such as speakers, printers, etc.

It is to be appreciated that the computer 802 can operate in a networked environment using logical connections to one or more remote computers 860. The remote computer 860 may be a workstation, a server computer, a router, a peer device or other common network node, and typically includes many or all of the elements described relative to the computer 802, although, for purposes of brevity, only a memory storage device 862 is illustrated in FIG. 8. The logical connections depicted in FIG. 8 can include a local area network (LAN) 864 and a wide area network (WAN) 866. Such networking environments are commonplace in offices, enterprise-wide computer networks, intranets and the Internet.

When used in a LAN networking environment, for example, the computer 802 is connected to the local network 864 through a network interface or adapter 868. When used in a WAN networking environment, the computer 802 typically includes a modem (e.g., telephone, DSL, cable, etc.) 870, or is connected to a communications server on the LAN, or has other means for establishing communications over the WAN 866, such as the Internet. The modem 870, which can be internal or external relative to the computer 802, is connected to the system bus 808 via the serial port interface 844. In a networked environment, program modules (including application programs 834) and/or program data 838 can be stored in the remote memory storage device 862. It will be appreciated that the network connections shown are exemplary and other means (e.g., wired or wireless) of establishing a communications link between the computers 802 and 860 can be used when carrying out an aspect of the present invention.

In accordance with the practices of persons skilled in the art of computer programming, the present invention has been described with reference to acts and symbolic representations of operations that are performed by a computer, such as the computer 802 or remote computer 860, unless otherwise indicated. Such acts and operations are sometimes referred to as being computer-executed. It will be appreciated that the acts and symbolically represented operations include the manipulation by the processing unit 804 of electrical signals representing data bits which causes a resulting transformation or reduction of the electrical signal representation, and the maintenance of data bits at memory locations in the memory system (including the system memory 806, hard drive 816, floppy disks 820, CD-ROM 824, and remote memory 862) to thereby reconfigure or otherwise alter the computer system's operation, as well as other processing of signals. The memory locations where such data bits are maintained are physical locations that have particular electrical, magnetic, or optical properties corresponding to the data bits.

Figure 9:
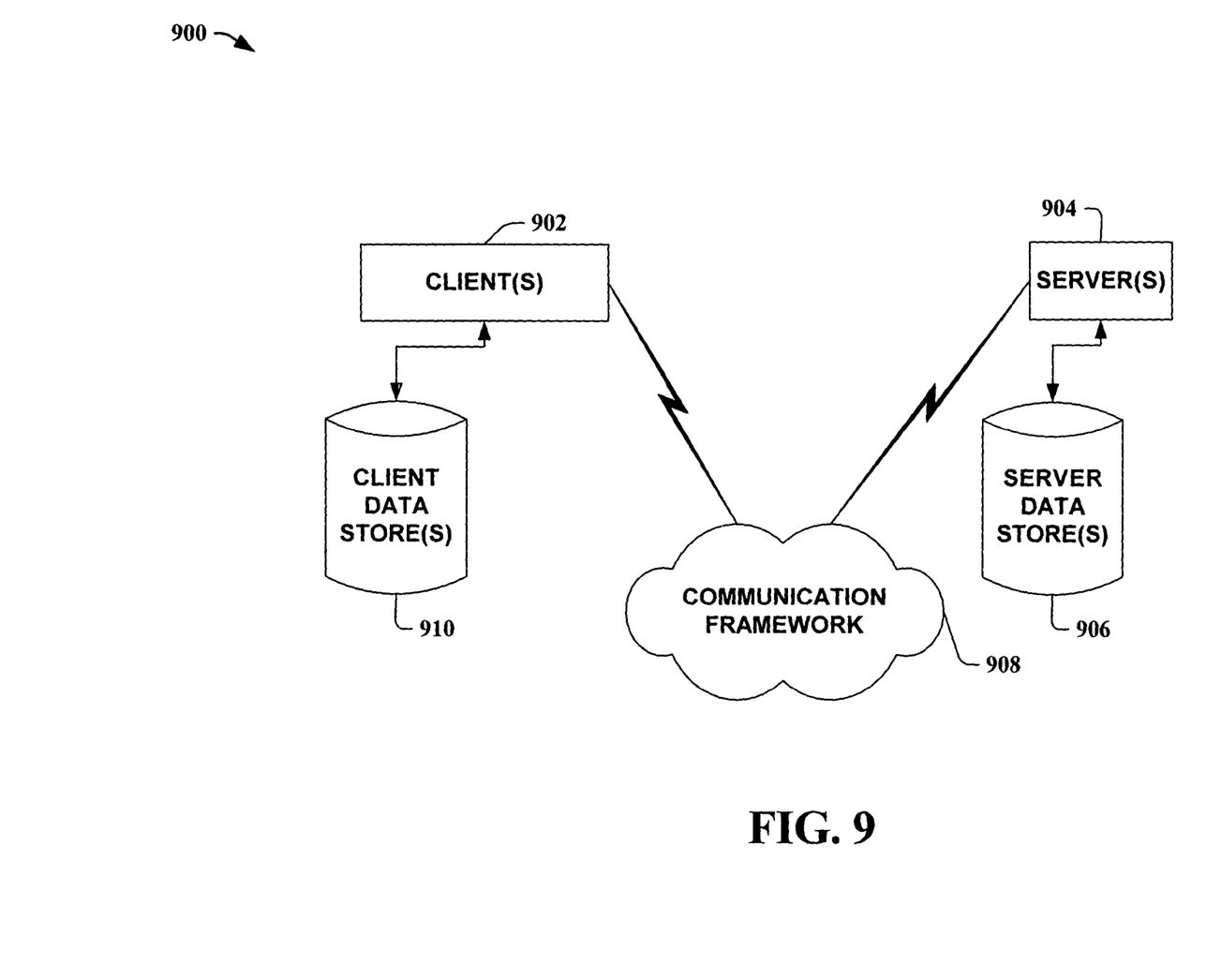
FIG. 9 illustrates another example operating environment in which the present invention can function.

FIG. 9 is another block diagram of a sample computing environment 900 with which the present invention can interact. The system 900 further illustrates a system that includes one or more client(s) 902. The client(s) 902 can be hardware and/or software (e.g., threads, processes, computing devices). The system 900 also includes one or more server(s) 904. The server(s) 904 can also be hardware and/or software (e.g., threads, processes, computing devices). The servers 904 can house threads to perform transformations by employing the present invention, for example. One possible communication between a client 902 and a server 904 may be in the form of a data packet adapted to be transmitted between two or more computer processes. The system 900 includes a communication framework 908 that can be employed to facilitate communications between the client(s) 902 and the server(s) 904. The client(s) 902 are operably connected to one or more client data store(s) 910 that can be employed to store information local to the client(s) 902. Similarly, the server(s) 904 are operably connected to one or more server data store(s) 906 that can be employed to store information local to the servers 904.

In one instance of the present invention, a data packet transmitted between two or more computer components that facilitate prediction, the data packet is comprised of, at least in part, information relating to prediction that utilizes, at least in part, a top-n list seeded by default scores for variables, exclusive of invalidation variables, of decision graphs/trees.

In another instance of the present invention, a computer readable medium storing computer executable components of a system for facilitating prediction is comprised of, at least in part, a prediction system that determines, at least in part, a top-n list seeded by default scores for variables of decision graphs/trees.

It is to be appreciated that the systems and/or methods of the present invention can be utilized in prediction systems facilitating computer components and non-computer related components alike. Further, those skilled in the art will recognize that the systems and/or methods of the present invention are employable in a vast array of electronic related technologies, including, but not limited to, computers, servers and/or handheld electronic devices and the like.

It is also to be appreciated that a list produced by the present invention can include, but is not limited to, such items as news stories, television shows, software applications, internet web pages, internet addresses, people, movies, and restaurants and the like. Anything that an entity, such as a user, has a preference about can be utilized by the present invention to provide a prediction list.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A machine implemented data analysis system that facilitates determination of a user preference, comprising:
    a component that creates a computer readable list to facilitate prediction; the list is initially based on a first set of scores for variables, exclusive of invalidated variables, of decision graphs/trees, the first set of scores comprise default scores, the component includes the invalidated variables in a computer readable variable-invalidation list, the variable-invalidation list includes each invalidated variable associated with at least one variable that invalidates it; and
    an analysis component that refines the list via a second set of scores for invalidated variables of the decision graphs/trees based upon the variable-invalidation list, the analysis component refines the list by utilizing a union of the first set of scores and the second set of scores.

2. The system of claim 1, at least one score is obtained via a conditional probability of a value of a variable of the decision graphs/trees.

3. The system of claim 1, at least one score is obtained via a lift of a value of a variable of the decision graphs/trees.

4. The system of claim 1, the second set of scores comprising maximum possible scores for variables, exclusive of invalidation variables, of the decision graphs/trees.

5. The system of claim 1, the second set of scores comprising invalidation variable scores of the decision graphs/trees.

6. The system of claim 1, the first set of scores comprising invalidation variable scores of the decision graphs/trees.

7. The system of claim 1, the second set of scores comprising default scores for variables of the decision graphs/trees.

8. The system of claim 1, the list comprising a top-n prediction list.

9. The system of claim 1, the list comprising news stories.

10. The system of claim 1, the list comprising television shows.

11. The system of claim 1, the list comprising software applications.

12. The system of claim 1, the list comprising internet web pages.

13. The system of claim 1, the list comprising internet addresses.

14. The system of claim 1, the list comprising people.

15. The system of claim 1, the list comprising movies.

16. The system of claim 1, the list comprising restaurants.

17. The system of claim 8, the top-n prediction list is in descending order with a last item comprising an inclusion threshold.

18. A data analysis system that facilitates determination of user preferences, comprising:
    means for compiling default scores for variables, exclusive of invalidated variables, of decision graphs/trees, the invalidated variables comprising a variable-invalidation list of each variable associated with a plurality of variables that it invalidates, the variable-invalidation list employed to construct an invalidation list by taking a union of a set of evidence and the variable-invalidation list; and
    means for generating a top-n prediction list to facilitate item prediction, the top-n prediction list is seeded by the default scores for the variables.

19. The system of claim 18, further including:
    means for refining the top-n prediction list utilizing maximum possible scores for variables, exclusive of the invalidation variables, of the decision graphs/trees.

20. The system of claim 18, further including:
    means for refining the top-n prediction list utilizing invalidation variable scores of the decision graphs/trees.

21. A data analysis system, comprising:
    means for compiling invalidation scores for variables of decision graphs/trees, the means for compiling employing an variable-invalidation list of each variable associated with variables that it invalidates and a set of evidence to create an invalidation list by taking a union of the variable-invalidation list and the set of evidence; and
    means for generating a top-n prediction list to facilitate item prediction, the top-n prediction list is seeded by non-default scores of the variables in the invalidation list, the top-n prediction list employed to produce recommendations of user preferences.

22. The system of claim 21, further including:
    means for refining the top-n prediction list utilizing default scores for variables of the decision graphs/trees.

23. A computer readable medium having stored thereon computer executable components of the system of claim 1.

24. A device employing the system of claim 1 comprising at least one selected from the group consisting of a computer, a server, and a handheld electronic device.

* * * * *